Nov. 25, 1924.

A. S. SPEER

Re. 15,955

APPARATUS FOR CUTTING ROOFING SHEETS

Original Filed April 5, 1919 3 Sheets-Sheet 1

Inventor.
Alexander S. Speer.
By: Emery, Booth, Janney & Varney.
Attys

Nov. 25, 1924.

Re. 15,955

A. S. SPEER

APPARATUS FOR CUTTING ROOFING SHEETS

Original Filed April 5, 1919 3 Sheets-Sheet 2

Inventor.
Alexander S. Speer.
By: Emery, Booth, Janney & Varney.
Attys

Nov. 25, 1924.

A. S. SPEER

Re. 15,955

APPARATUS FOR CUTTING ROOFING SHEETS

Original Filed April 5, 1919 3 Sheets-Sheet 3

Inventor.
Alexander S. Speer.
By: Emery, Booth, Janney & Varney
Attys.

Reissued Nov. 25, 1924.

Re. 15,955

UNITED STATES PATENT OFFICE.

ALEXANDER S. SPEER, OF BUFFALO, NEW YORK, ASSIGNOR, BY MESNE ASSIGNMENTS, TO THE BEAVER PRODUCTS COMPANY, INC., A CORPORATION OF NEW YORK.

APPARATUS FOR CUTTING ROOFING SHEETS.

Original No. 1,352,154, dated September 7, 1920, Serial No. 287,819, filed April 5, 1919. Application for reissue filed November 23, 1921. Serial No. 517,384.

*To all whom it may concern:*

Be it known that I, ALEXANDER S. SPEER, a citizen of the United States, residing at Buffalo, in the county of Erie and State of New York, have invented an Improvement in Apparatus for Cutting Roofing Sheets, of which the following is a specification.

My present invention relates to improvements in apparatus for cutting roofing slabs or shingles from sheets of composite material and the invention aims to provide a simple, economical and efficient machine which will cut such shingles or slabs with a minimum waste of material.

The invention includes the novel features of construction and arrangement of parts hereinafter described and particularly defined by the appended claims.

An embodiment of my invention is illustrated in the accompany drawings, in which, Figure 1 is a plan view of a form of machine constructed in accordance with my invention.

Figure 1:
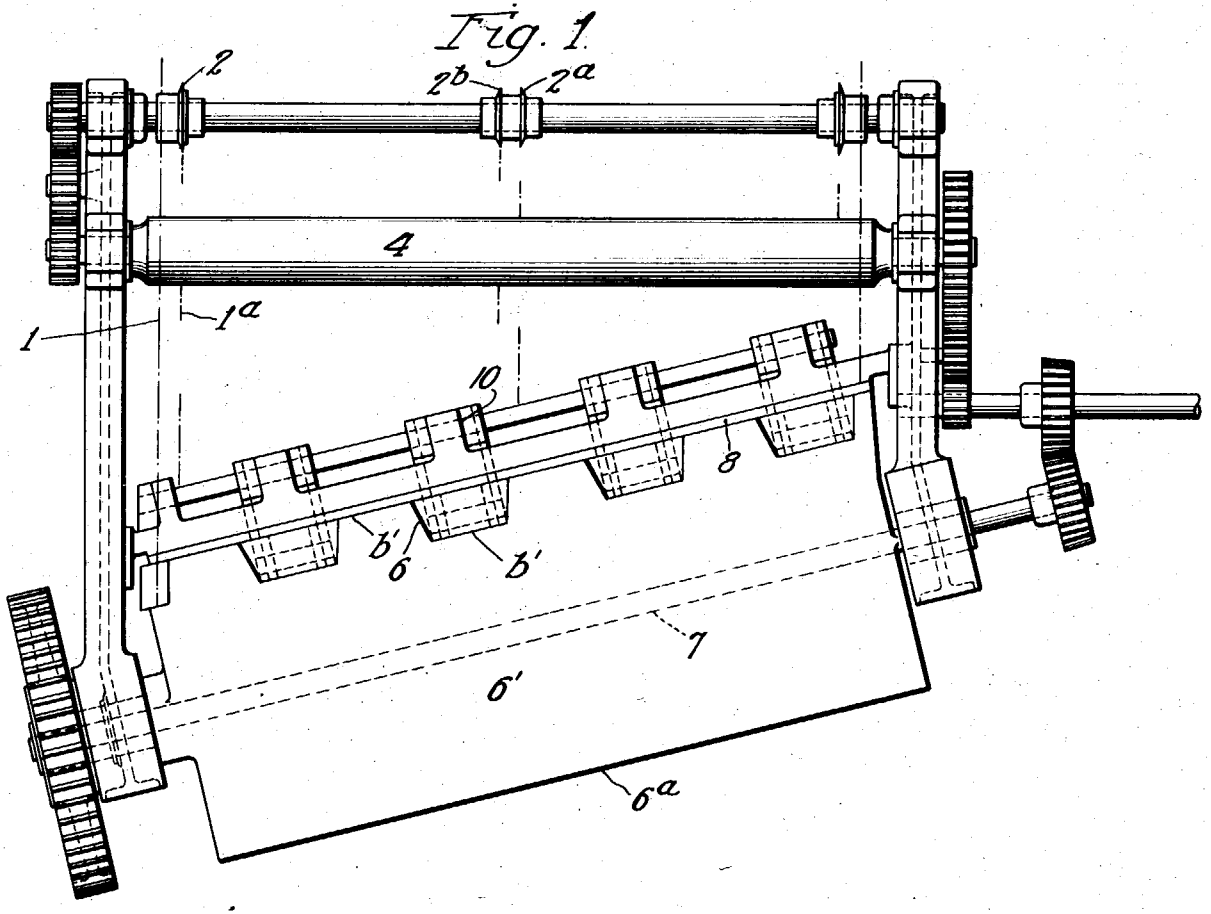
Figure 2:
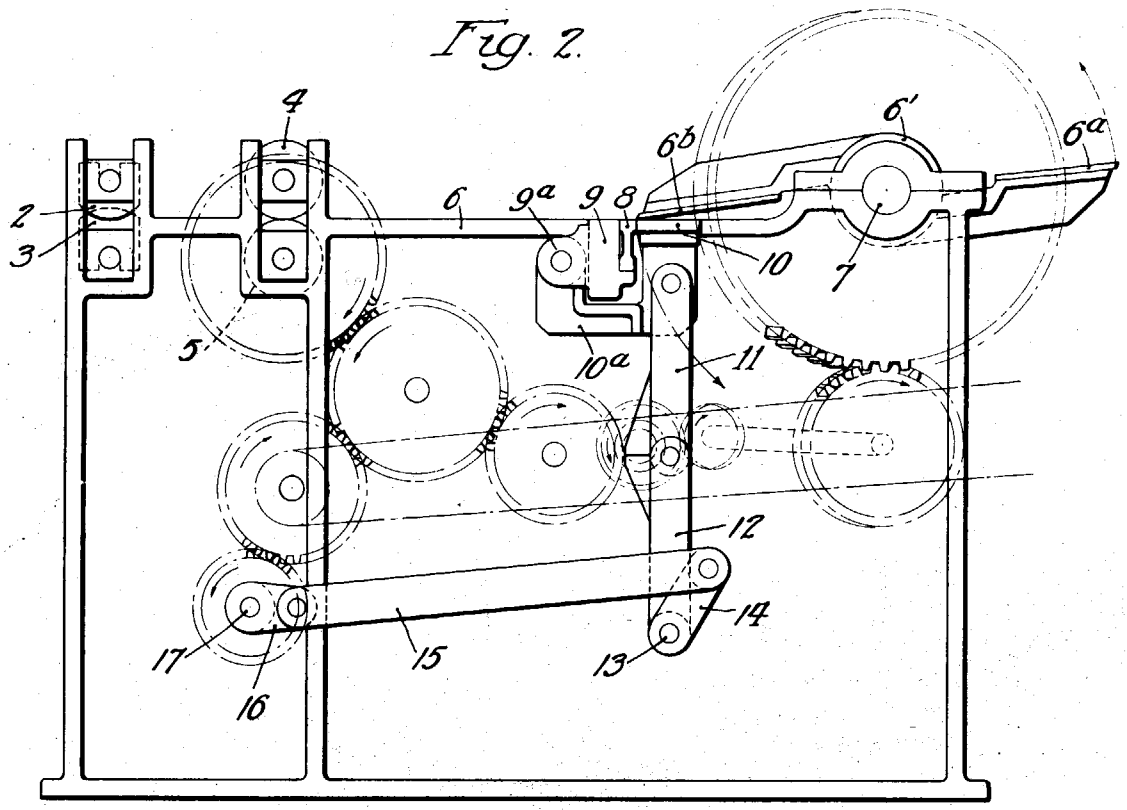
Fig. 2 is a side elevation.
Figure 3:
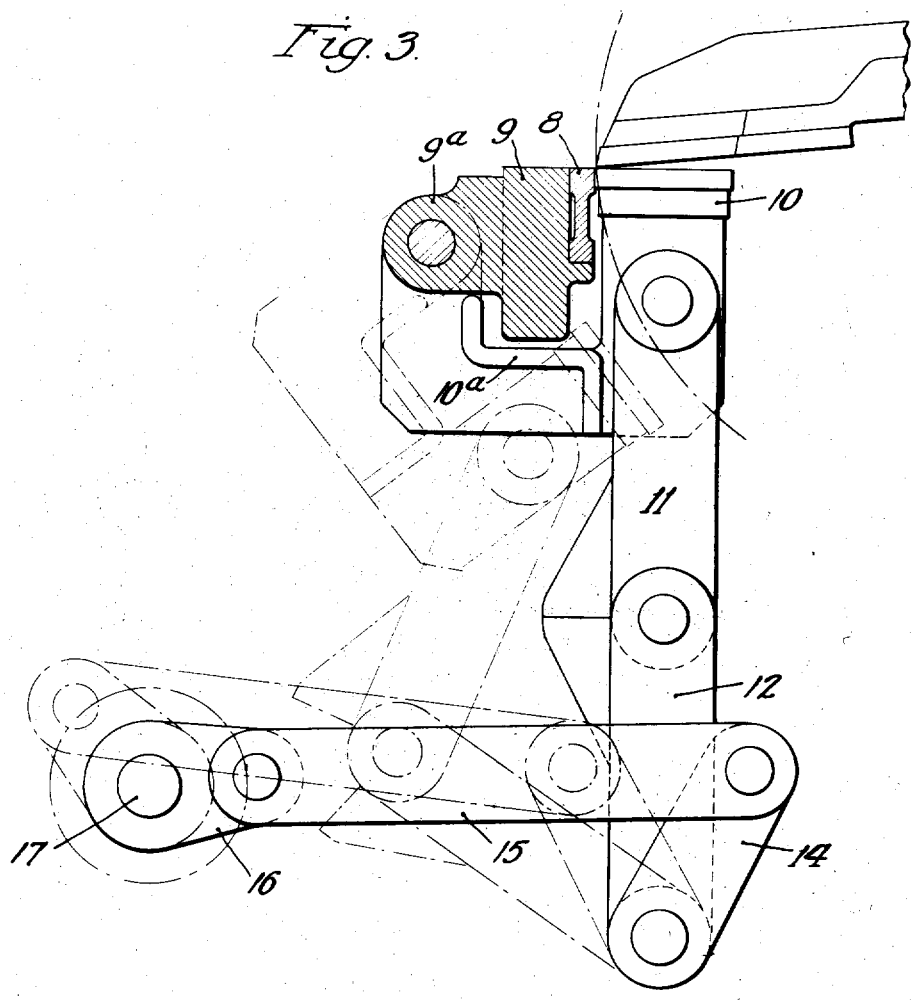
Fig. 3 is a sectional detail.

My present machine is designed more especially for cutting roofing slabs having diagonal edges, such as disclosed in an application filed by me in the U. S. Patent Office on the 7th day of April, 1919, Serial Number 288,035, and is herein shown as designed to cut such slabs or shingle units with shingle projections on the lower edge or that edge of the shingle which is exposed when applied to a roof.

In the present drawings also the machine is shown for convenience as of a width to handle a strip or sheet of roofing material sixty-four inches wide and to cut therefrom two rows of slabs or shingles. Such a sheet of roofing material is indicated in the drawings at 1 and it is fed between upper and lower slitting rollers 2 and 3, which slit it in a manner and for a purpose hereinafter more fully set forth. Thence the sheet passes between the upper and lower feed rollers 4 and 5 to the feed table 6. To sever the sheet into slabs having one straight (upper) edge and one (lower) serrated or tongued edge I provide alternately acting cutters having respectively straight and irregular edges and these cutters coact with a correspondingly alternately changing die face which is held stationary during the cutting and severing operation. In the embodiment shown in the drawings I have shown a revolving cutter blade 6′ mounted on a shaft 7 journaled in the frame of the machine and provided with one edge straight, as shown at $6^a$, and the other edge irregular or shaped to provide the desired configuration on the other edge of the shingle, as shown at $6^b$, this configuration being one comprising trapezoidal or semi-hexagonal projections separated by equal and complementary spaces. Various means might be provided to secure alternately positioned dies to coact with the alternately acting cutter blades, but the arrangement which I have deemed the simplest and herein shown is to provide a stationary straight shearing die or member 8 which may be conveniently removably supported by a die carrier 9 secured to or forming a part of the frame of the machine.

This die 8 coacts with the straight edge $6^a$ of the severing knife and also with the advanced portions $b$ of the edge $6^b$. For cooperating with the recessed portions $b'$ of the edge $6^b$ I provide removable shear block or die members 10 which have curved shanks $10^a$ hinged to lugs $9^a$ on the bar 9 and these members 10 are connected by links 11 with arms 12 carried by a rock shaft 13.

Fast on this rock shaft is an arm 14 which is connected by pitman 15, with a crank arm 16 on shaft 17. This shaft 17 is continuously driven and so timed relative to the rotation of the cutter shaft 7 that the die members 10 are presented in position to coact with knife edge $6^b$ and are withdrawn or dropped down out of the way to allow the straight die member 8 to coact with the straight knife edge $6^a$.

It will thus be seen that at each half rotation of the cutter 6 the cooperating straight edges of the cutter and die cut the straight edges of shingles lying on both sides of the line of cut, and on the next half rotation the irregular cutting edge and the shear block or die similarly form the serrated or irregular edges of the shingles on opposite sides of the line of cut.

To produce the bias cut slabs having diagonal edges hereinbefore referred to I arrange the cutter shaft diagonal or inclined to the feed and preferably in such relation to the sheet that the side edges of the sheet will coincide with or form the sides of the terminal tongues on the serrated edge.

For shingles or slabs of some dimensions it is better to have the edge of the shingle offset slightly from the side wall of the tongue as indicated by the lines on the sheet of material where $1^b$ designates the tongue and $1^a$ the offset edge referred to. This is accomplished by the slitters 2 and 3 above referred to which are segments of circles and which cooperate to form isolated slits in the sheet prior to the action of the cutters and which slits define the end edges of the individual slabs or shingles. The central slitters designated $2^a$ and $2^b$ respectively are arranged so as to cut slits in staggered relation as shown.

The various moving parts are connected up by gearing as shown diagrammatically and may be driven from any suitable source of power, not shown.

Having thus described my invention what I claim is:

1. Apparatus of the character described comprising means for feeding a sheet of material, a pair of alternately acting cutters having different profiles, a stationary die for cooperating with one cutter, and supplemental die means movable into and out of juxtaposition to said stationary die for cooperating with the other cutter.

2. Apparatus of the class described comprising a pair of alternately acting cutters of different profile moving in substantially the same path, and die means having alternately changing profile to cooperate with said cutters.

3. Apparatus of the class described comprising a rotary shaft, a pair of cutting blades carried thereby, having cutting edges of different profile moving in substantially the same path, a stationary die cooperating with the edge of one blade, and supplemental die means moved into and out of juxtaposition to said stationary die to cooperate with the other blade.

4. Apparatus of the class described comprising a rotary shaft, a pair of cutting blades carried thereby, one having a straight blade and the other a notched blade, a straight edged stationary die member for cooperating with said straight edged cutter, and movable, supplemental die means cooperating with said straight edged die to coact with said notched blade.

5. Apparatus of the class described comprising a rotary shaft, a pair of cutting blades carried thereby, one having a straight blade and the other a notched blade, a straight edged stationary die member for cooperating with said straight edged cutter, a plurality of supplemental die members, and means for moving them into juxtaposition to said straight edged die to cooperate with the notched blade.

6. Apparatus of the character described comprising sheet feeding means, a rotary shaft, a pair of cutting blades carried thereby, one having a straight edge and the other having its edge provided with flaring recesses, said shaft being disposed at an inclination to the line of feed corresponding to the inclination of the recess wall, a stationary die for cooperating with the straight edged cutter, and supplemental die means movable into and out of juxtaposition to said stationary die for cooperating with the notched blade.

7. Apparatus of the class described comprising a straight edged cutter and a recessed cutter with means for bringing them alternately into cutting position, a straight edged stationary die cooperating with said straight edged cutter, supplemental die means corresponding to the recesses of the second named cutter and hinged on fixed axes, and means for swinging said supplemental die means into juxtaposition to said stationary die to cooperate with said recessed cutter.

8. In a machine for cutting flexible sheet roofing into shingle units, the combination with a frame and means for feeding the sheet roofing of a shear block having a cutting edge with alternating projections and recesses, said projections being semi-hexagonal in shape, said cutting edge being arranged at an angle to the sheet so that one side of the projections on said cutting edge is parallel to the side edge of said sheet, and a rotary cutter having its axis parallel to the general line of said shear block cutting edge and having a cutting edge to cooperate with said shear block cutting edge, and adapted to sever a shingle unit diagonally of said sheet, so that one side of a shingle projection is parallel with the end of said unit.

9. Apparatus for cutting shingle units from composite sheet roofing, comprising in combination, sheet feeding means, means for cutting the sheet including a cutting blade having its edge provided with flaring recesses, said cutting blade being disposed at an inclination to the line of feed corresponding to the inclination of the recess wall, and a die means for cooperating with said cutting blade.

10. A machine of the character described, comprising a pair of successively acting cutters and a cutting member for cooperating with one of said cutters and a movable cutting member for cooperating with the other of said cutters, and means for moving said movable cutting member into and out of operative position.

11. A machine of the character described, comprising a cutting device, a cutting member for cooperating with said cutting device to act on material, a movable member constructed and arranged to cooperate at intervals with said cutting device, and means for moving said movable member into and out of operative position relative to said cutting device.

12. A machine for forming shingle units from flexible sheet roofing material, comprising in combination a pair of successively acting cutters of different contours, means for feeding material toward said cutters, and a cooperating cutting member, said cutter and cutting member being constructed and arranged to act on materials on lines oblique to the feed of said material, thereby to form shingle units having inclined ends.

13. A machine for cutting flexible sheet roofing into shingle units, comprising in combination a frame having means for feeding the sheet roofing, an obliquely arranged shear member having a cutting edge with alternating projections and recesses similar in outline to that of the front edge of a shingle unit and arranged diagonally of said sheet, a movable cutter arranged to cooperate with said shear member cutting edge and arranged to operate on said sheet obliquely to the travel thereof, said feeding means cooperating with said movable cutter to advance the sheet toward the cutter, whereby the latter severs a shingle unit from said sheet on the bias.

14. A machine for forming from flexible sheet roofing material shingle units having projections and recesses along their edges, comprising in combination, a frame having means for feeding a sheet of said material, a rotary cutter having projections and recesses corresponding in contour with an edge of the shingle unit to be cut thereby, a cooperating cutting member arranged to cooperate with the cutter for acting on the sheet, said cutter and cutting member being arranged obliquely to cut said sheet on lines oblique to the travel of said sheet.

15. In a machine for forming shingle units from flexible sheet roofing material, the combination comprising a frame and means for feeding a sheet of said material, an obliquely arranged cutting bed for the sheet, a cutting member having an edge cooperating with said cutting bed and disposed to act on said sheet along transverse lines oblique to the direction of travel of said sheet, and said edge of said cutting member having projections and recesses arranged to conform in contour with certain edges of the shingle unit to be formed, and mechanism for operating said cutting member at intervals to act on said sheet, whereby said shingle units are formed from said sheet on the bias.

16. A machine for forming recessed shingle units from flexible sheet roofing material, comprising in combination a frame having means for feeding a sheet of material, a cutter having projections and recesses corresponding in contour with an edge of the shingle unit to be cut thereby, a cooperating cutting member constructed and arranged to cooperate with the cutter for acting on the sheet, said cutter and cutting member arranged to be oblique to the travel of said sheet.

17. A machine for forming shingle units from flexible sheet roofing material, comprising in combination, a frame having means for feeding a sheet of material, a cutter having projections and recesses corresponding in contour with an edge of the shingle unit to be cut thereby, a cutting member having projections and recesses corresponding in contour with the edge of said cutter and cooperating therewith to cut said sheet, said cutter and cutting member being arranged obliquely to the direction of travel of said sheet to cut said sheet on the bias, thereby to form shingle units having inclined ends.

ALEXANDER S. SPEER.